(12) United States Patent
Zhang

(10) Patent No.: US 7,458,386 B2
(45) Date of Patent: Dec. 2, 2008

(54) MANUAL GAS VALVE WITH NATURAL/LP GAS CONVERSION CAPABILITY

(75) Inventor: Feng Zhang, Ninghai (CN)

(73) Assignee: Ningbo Wanan Co., Ltd., Zhejiang (CH)

( * ) Notice: Subject to any disclaimer, the term of this patent is extended or adjusted under 35 U.S.C. 154(b) by 0 days.

(21) Appl. No.: 11/618,765

(22) Filed: Dec. 30, 2006

(65) Prior Publication Data

US 2008/0156378 A1    Jul. 3, 2008

(51) Int. Cl.
*F16K 21/00*    (2006.01)
(52) U.S. Cl. ............... 137/15.18; 137/269; 137/270; 137/625.32; 251/207; 251/209
(58) Field of Classification Search .............. 137/269, 137/599.17, 601.16, 601.19, 625.32, 905, 137/270, 15.18; 251/207, 209
See application file for complete search history.

(56) References Cited

U.S. PATENT DOCUMENTS 2,987,078 A * 6/1961 Du Perow .............. 137/599.17
5,009,393 A * 4/1991 Massey ..................... 251/207
7,156,370 B2 * 1/2007 Albizuri .................... 251/207

* cited by examiner

*Primary Examiner*—Kevin L Lee
(74) *Attorney, Agent, or Firm*—Matthias Scholl P.C.; Matthias Scholl

(57) ABSTRACT

The invention relates to a manual gas valve for use with either LP gas or natural gas operation with the purpose of solving the technical dilemma that the existing gas valve cannot be converted conveniently for use with different gases having different heating values. The manual gas valve of the present invention comprises a nozzle 1, a 8×1.9 O-shaped ring 2, a nozzle holder 3, a valve body 4, a faucet 5, a regulating lever 6, a 1.78×1.78 O-shaped ring 7, a spring 8, a stop plate 9, a pair of bolts 10, a mounting cover 11, and a valve stem 12. By utilizing the manual gas valve of the present invention, LP gas and natural gas can be used interchangeably and the gas flow can be conveniently regulated to achieve a similar heating value with either LP gas or natural gas operation. In addition, the conversion is easy and convenient, without requiring the use of any special tools or relying on any additional testing apparatus. No special skill or training is needed so that it is particularly suitable for self regulating operation by customers. Moreover, the manual gas valve is safe and reliable.

8 Claims, 4 Drawing Sheets

MANUAL GAS VALVE WITH NATURAL/LP GAS CONVERSION CAPABILITY

BACKGROUND OF THE INVENTION

1. Field of the Invention

This invention relates to a manual gas valve for a gas appliance that can be easily and reliably converted for use with either natural gas or Liquid Propane (LP) gas and that provides a similar heating value using either natural gas or LP gas.

2. Description of the Related Art

It is well known to those skilled in the art that natural gas and LP gas have different heating values, and are supplied to a gas appliance under different pressures or flows. Several solutions have been proposed to operate with either natural gas or LP gas, such as: (1) exchanging the existing valve for a valve with a different flow rate; (2) reducing the pressure of the LP gas further after it flows out of its original pressure reducing valve; and (3) adopting a conical valve to regulate the gas flow at a low level on a special tester and replacing the nozzles with nozzles having different orifice diameters to change the gas flow at a high level. All of these solutions are a great inconvenience and carry a substantial cost increase associated with conversion. Accordingly, there is still a need for a valve that can be reliably and effectively converted from the use of natural gas to the use of LP gas.

SUMMARY OF THE INVENTION

In view of the above-described problems, it is an objective of the present invention to provide a manual gas valve with a specially designed configuration, by which the flow of either natural gas or LP gas can be easily regulated to achieve a similar heating value and thereby to reliably supply the normal operation of a gas appliance. In addition, the manual gas valve can be operated conveniently and is cost saving.

To achieve the above objective, a manual gas valve in accordance with the present invention comprises a nozzle 1, an 8×1.9 O-shaped ring 2, a nozzle holder 3, a valve body 4, a faucet 5, a regulating lever 6, a 1.78×1.78 O-shaped ring 7, a spring 8, a stop plate 9, a pair of bolts 10, a mounting cover 11, and a valve stem 12.

In certain embodiments of the invention, the manual gas valve can easily be converted for use with either natural gas or LP gas without using any special tools, the amount of gas flow can be regulated conveniently and precisely to meet the specified requirements without using any additional testing apparatus. In addition, the operation is easy and no special skill or training is needed so that it is particularly suitable for self-operation by customers. It is also safe and reliable;

In certain embodiments of the invention, and referring to FIGS. 2a and 2b, the setting of either LP gas or natural gas flow at a high level is performed on the specially designed nozzle part. When LP gas is being used, nozzle 1 is screwed down (FIG. 2b), the LP gas flows to orifice I after it is throttled by orifice H to supply the operation of the gas appliance, and the amount of LP gas flow is determined by the cross sectional area of orifice H. When natural gas is being used, owing to its low heating value, nozzle 1 is screwed out (FIG. 2a), the natural gas flows to orifice I after it is throttled by the orifices H, G, and F simultaneously to supply the operation of the gas appliance, and the amount of natural gas flow is determined by the cross sectional area of orifice I.

In certain embodiments of the invention, and referring to FIGS. 3a and 3b, the setting of either LP gas or natural gas flow at a low level is performed on the specially designed faucet part. When LP gas is being used, orifice D or E of regulating lever 6 is not connected to orifice C of faucet 5, the LP gas is supplied after it is throttled by orifice B only, and the amount of LP gas flow is determined by the cross sectional area of orifice B (FIG. 3a). When natural gas is being used, owing to its low heating value, orifice C of faucet 5 is connected to orifice D or E of regulating lever 6 after regulating lever 6 is turned 90°, the natural gas is then supplied by the orifices B and C simultaneously, and the amount of natural gas flow is determined by the total cross sectional areas of the orifices B and C (FIG. 3b).

In certain embodiments of the invention, and referring to the configuration of FIGS. 1a and 1b, O-shaped seal rings 2 and 7 are adopted respectively to hermetically seal radially the nozzle and the faucet, and are machined respectively with a groove thereon.

DETAILED DESCRIPTION OF THE INVENTION

Figure 1A:
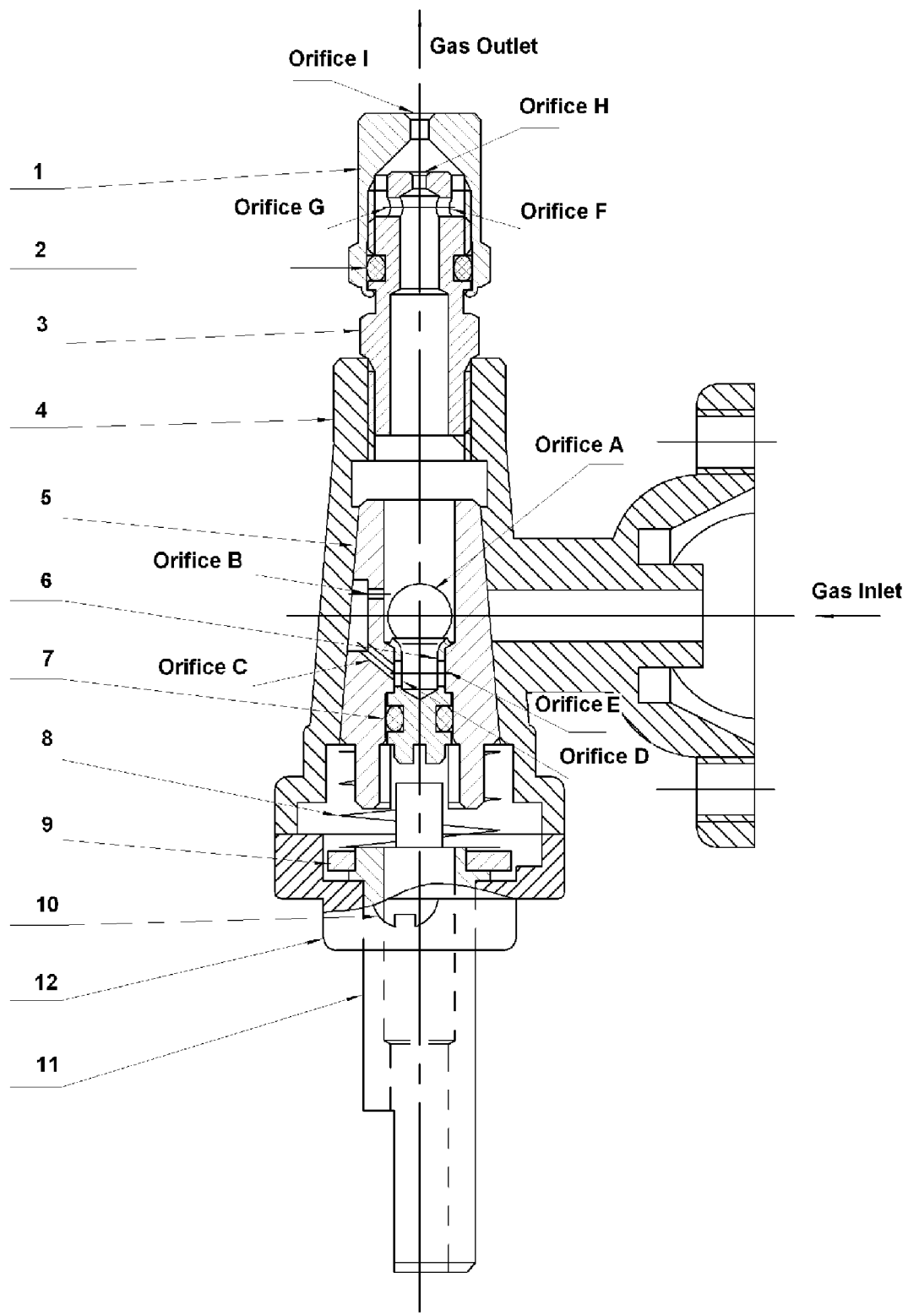
FIGS. 1a and 1b illustrate an assembly diagram of a manual gas valve in accordance with one embodiment of the present invention.
Figure 1B:
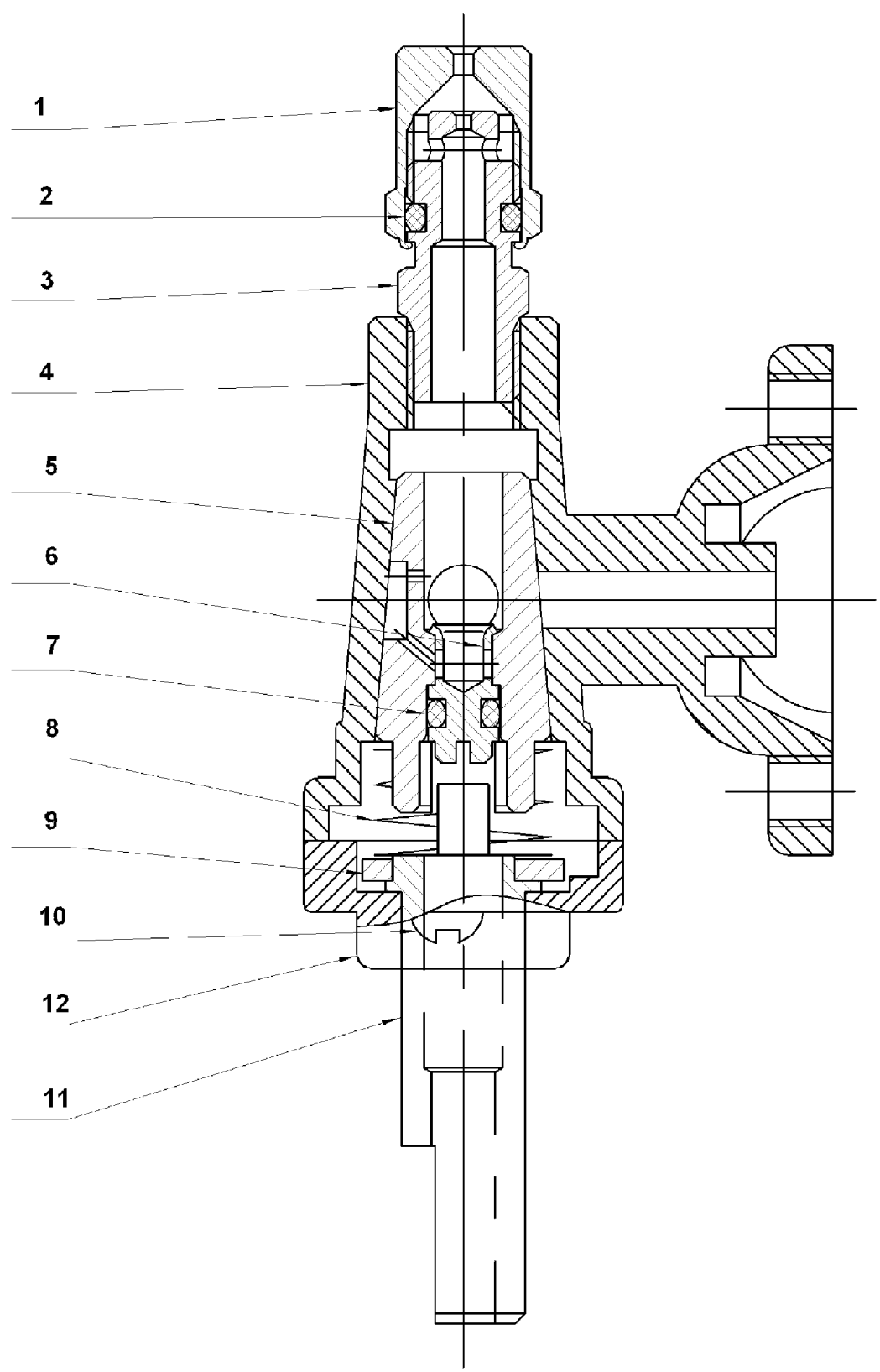
Figure 2A:
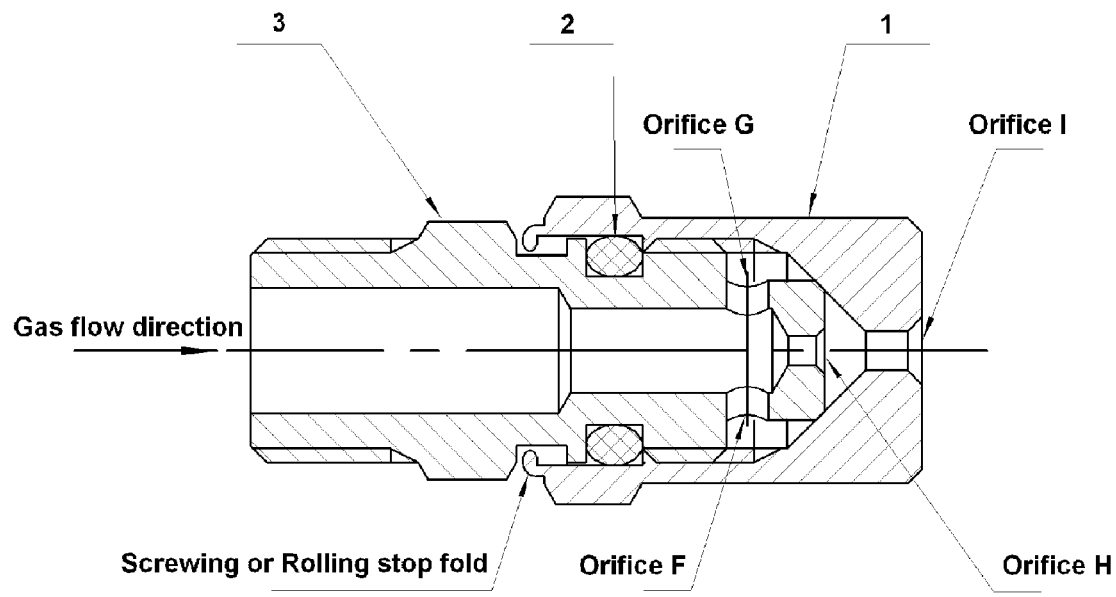
FIGS. 2a and 2b illustrate an assembly diagram of a nozzle for a manual gas valve in accordance with one embodiment of the present invention.
Figure 2B:
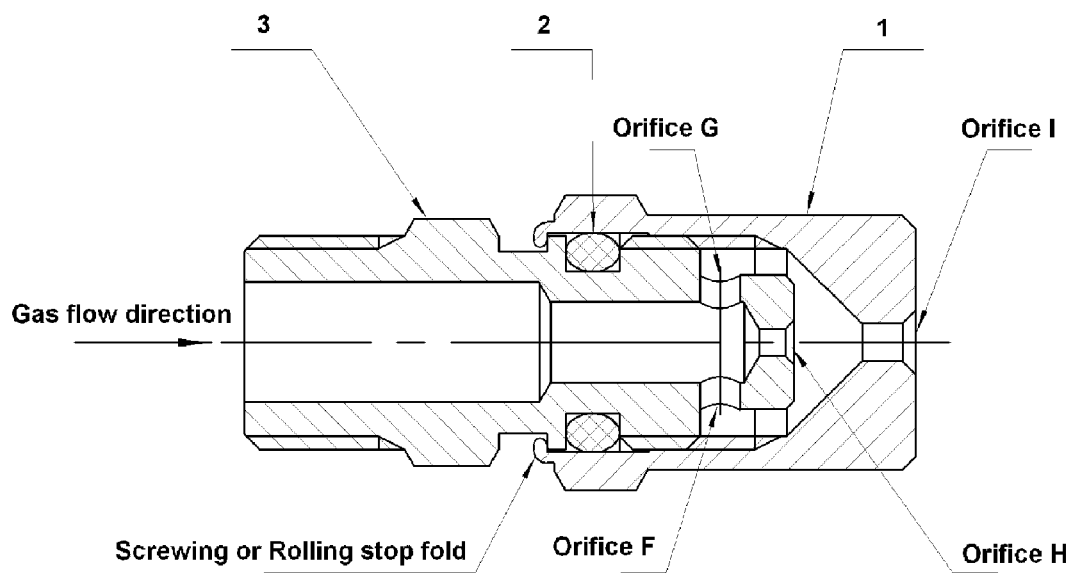
Figure 3A:
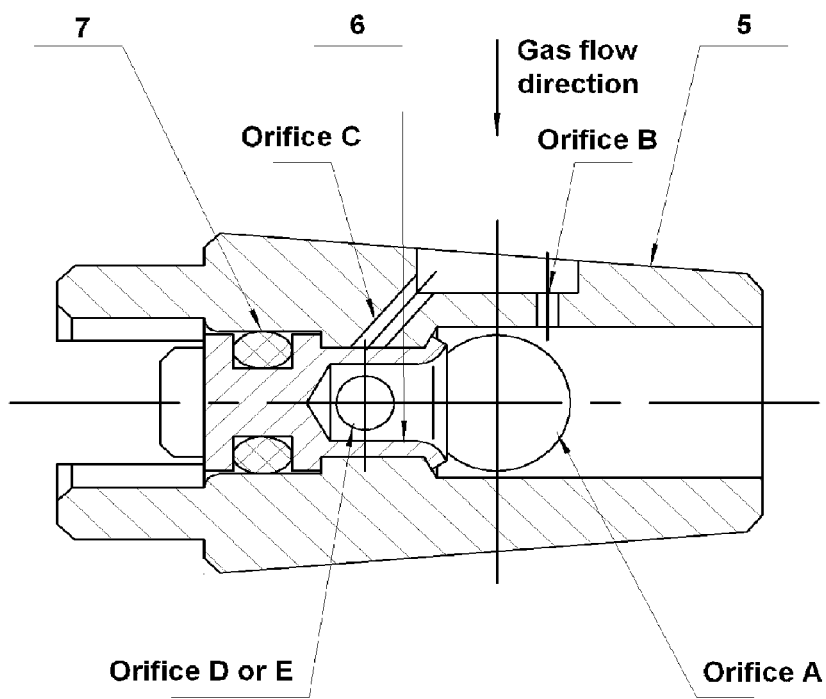
FIGS. 3a and 3b illustrate an assembly diagram of a faucet for a manual gas valve in accordance with one embodiment of the present invention.
Figure 3B:
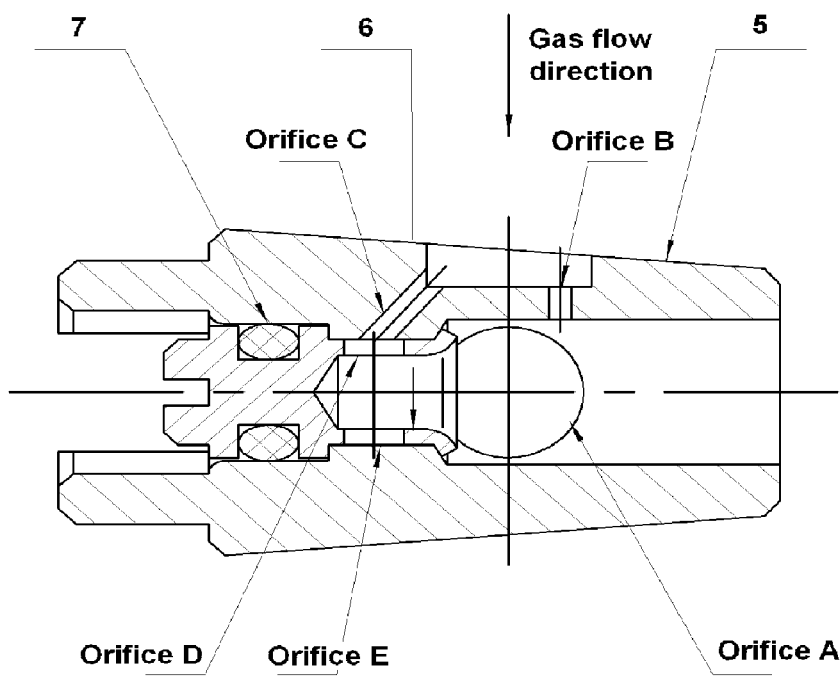

FIGS. 1a and 1b illustrates a manual gas valve of the present invention at its closed position in natural gas operation. If the valve is to be converted for use with LP gas, regulating lever 6 needs to be turned 90° to disconnect orifice C from orifice D and E, thereby reducing LP gas flow at a low level; then nozzle 1 needs to be screwed down to make the inner cone of nozzle 1 press tightly against the end face of nozzle holder 3, thereby disconnecting orifices G and F from orifice I. The LP gas then flows to orifice I via orifice H only so that the LP gas flow at the high level is reduced. If the valve is to be converted for use with natural gas, regulating lever 6 needs to be turned 90° further and nozzle 1 needs to be screwed down so that natural gas operation may be realized. Therefore, the conversion from natural gas operation to LP gas operation by the manual gas valve of the present invention is easy and reliable.

The operation and flow passage of LP gas and natural gas will be described hereinafter according to FIGS. 1a and 1b.

(1) Operation and flow passage when the manual gas valve is converted for use with natural gas. Based on the method mentioned above, after the valve is converted for use with natural gas, mounting cover 11 is turned, while faucet 5 is turned 90° counterclockwise to achieve natural gas flow operation at a high level. At this point, the natural gas enters through the gas inlet, flows to the orifices F, G, and H after passing through orifice A, and finally discharges through orifice I after it is throttled, to supply the gas needed for the operation of the gas appliance. If mounting cover 11 is turned 90° further, natural gas flow at a low level can be achieved. At this point, the natural gas enters through the gas inlet, and then discharges through orifice I after it is throttled by orifices B and C (the gas passing through orifice C is discharged through orifice D or E).

(2) Operation and flow passage when the manual gas valve is converted for use with LP gas. Based on the method mentioned above, after the valve is converted for use with LP gas, mounting cover 11 is turned, faucet 5 is turned 90° counterclockwise to achieve LP gas flow at a high level. At this point, the LP gas enters through the gas inlet, flows to orifice H after passing though orifice A, and finally discharges through orifice I after it is throttled by orifice H to supply gas for the operation of the gas appliance. If mounting cover 11 is turned 90° further, LP gas flow at a low level can be achieved. At this point, the LP gas enters through the gas inlet, and then discharges through orifice I after it is throttled by orifice B only.

While the invention has been described with respect to preferred embodiments, it will be clear to those skilled in the art that modifications and improvements may be made to the invention without departing from the spirit and scope of the invention. Therefore, the invention is not to be limited by the specific illustrative embodiment, but only by the scope of the appended claims.

What is claimed is:

1. A manual gas valve convertible for use with either LP gas or natural gas for gas appliances, comprising: a nozzle (1), a first O-shaped ring (2), a nozzle holder (3), a valve body (4), a faucet (5), a regulating lever (6), a second O-shaped ring (7), a spring (8), a stop plate (9), a bolt (10), a mounting cover (11), and a valve stem (12), wherein said regulation lever (6) is turnable and said nozzle (1) is screwable down to convert the valve for use with LP gas, and said mounting cover (11) and said faucet (5) are turnable to convert the valve for use with natural gas.

2. The manual gas valve of claim 1 adapted to a flow of LP gas or natural gas at a low level, wherein said faucet (5) and said regulating lever (6) are turnable to choke or open an orifice while another orifice is kept open so as to meet gas flow at the low level.

3. The manual gas valve of claim 2, wherein the gas flow is dependent on the cross sectional area or the diameter of each of the orifices so as to meet the requirements of gases having different heating values, and thereby to ensure a similar heating value for different gases.

4. The manual gas valve of claim 1, wherein the second O-shaped ring (2) is adapted to seal the faucet (5) with the regulating lever (6) and the first O-shaped ring (7) is adapted to seal the nozzle (1) with the nozzle holder (3) radially.

5. The manual gas valve of claim 1, wherein a screwing or rolling stop fold is applied to position axially the nozzle (1) and the nozzle holder (3).

6. A method for converting the gas valve of claim 1 to LP gas or natural gas at a high flow level, the method comprising:
  a) regulating the flow of LP gas or natural gas at high level by moving the nozzle (1) and the nozzle holder (3) axially to choke or open a certain number of orifices; and
  b) when a certain number of orifices are choked, the LP gas having a higher heating value flows out from one or more orifices with relative small orifice diameters to satisfy the amount requirement of gas flow at high level; and
  c) when a certain number of orifices are opened, the natural gas having a lower heating value flows out from one or more orifices with relative big orifice diameters to satisfy the amount requirement of gas flow at high level.

7. A method for converting the gas valve of claim 1 to a natural gas, the method comprising: a) turning on the mounting cover (11), and turning counterclockwise by 90° the faucet (5) to achieve natural gas flow operation at a high level; or b) turning the mounting cover (11) by 90° to achieve natural gas flow operation at a low level.

8. A method of manufacturing a manual gas valve comprising: a nozzle (1), a first O-shaped ring (2), a nozzle holder (3), a valve body (4), a faucet (5), a regulating lever (6), a second O-shaped ring (7), a spring (8), a stop plate (9), a bolt (10), a mounting cover (11), and a valve stem (12), the method comprising:
  a) assembling the faucet (5) with the regulating lever (6) and the second O-shaped ring (7);
  b) installing the valve body (4) with the spring (8), the stop plate (9), the mounting cover (11), and the valve stem (12) together, and fixing by means of a pair of bolts (10);
  c) assembling the nozzle holder (3) with the first O-shaped ring (2),
  d) installing the nozzle (1) into the nozzle holder (3), and screwing or rolling for positioning, and finally,
  e) screwing the nozzle holder (3) into the valve body (4).

* * * * *